United States Patent [19]

Kosarko et al.

[11] Patent Number: 4,833,556
[45] Date of Patent: May 23, 1989

[54] LOW DRAG STABILIZER DEVICE FOR STABILIZING THE INTERFACE BETWEEN A TRANSDUCER AND A MOVING MEDIUM

[75] Inventors: Gerald J. Kosarko, Pavilion; Rodney D. Wagner, Rochester, both of N.Y.

[73] Assignee: Eastman Kodak Company, Rochester, N.Y.

[21] Appl. No.: 136,793

[22] Filed: Dec. 22, 1987

[51] Int. Cl.$^4$ .......................... G11B 5/60; G11B 17/32
[52] U.S. Cl. ...................................... 360/102; 360/86; 360/99.03; 360/130.34; 360/133
[58] Field of Search ................. 360/99, 102, 103, 104, 360/105, 110, 122, 125, 128, 130.34, 86, 133

[56] References Cited

U.S. PATENT DOCUMENTS

| | | | |
|---|---|---|---|
| 3,821,813 | 6/1974 | Freeman et al. | 360/103 |
| 4,003,091 | 1/1977 | Wright | 360/102 |
| 4,151,573 | 4/1979 | Tandon et al. | 360/104 |
| 4,376,960 | 3/1983 | Karol | 360/99 |
| 4,379,315 | 4/1983 | Schuler | 360/105 |
| 4,396,965 | 8/1983 | De Moss | 360/102 |
| 4,414,592 | 11/1983 | Losee et al. | 360/102 |
| 4,533,968 | 8/1985 | Yoshida et al. | 360/130.21 |
| 4,578,727 | 3/1986 | Hills | 360/102 |
| 4,620,250 | 10/1986 | Hills | 360/102 |

FOREIGN PATENT DOCUMENTS

| | | | |
|---|---|---|---|
| 54-23517 | 2/1979 | Japan | 360/103 |
| 54-143217 | 8/1979 | Japan | 360/122 |
| 56-83869 | 7/1981 | Japan | 360/122 |
| 57-105824 | 7/1982 | Japan | 360/103 |
| 59-193580 | 11/1984 | Japan | 360/122 |
| 59-229767 | 12/1984 | Japan | 360/103 |
| 62-14317 | 1/1987 | Japan | 360/125 |
| 2179486 | 3/1987 | United Kingdom | 360/135 |
| 86/03048 | 5/1986 | World Int. Prop. O. | |

OTHER PUBLICATIONS

"Stabilized Wasp-Waist Head", by Nelson et al., IBM Techn. Discl. Bulletin, vol. 19, No. 5, Oct. 1976, p. 1885.
"Developing Matnetic Head Materials for High-Density Recording and Mounting", by Yukio Eguchi, Jour. of Elec. Engr., Dec. 1986, pp. 73-76.
Ser. No. 019,468, MacDonald et al., "Stabilizer Device Having an Edge Configuration for Stabilizing the Interface Between a Transducer and a Moving Medium"), filed Feb. 26, 1987.

Primary Examiner—John H. Wolff
Attorney, Agent, or Firm—David M. Woods

[57] ABSTRACT

A ceramic stabilizer is shown for minimizing the drag experienced in a magnetic interface between the stabilizer and a rapidly moving pliable magnetic disk. The stabilizer includes a stabilizing block with an opening through which a magnetic head protrudes for engagement with the disk. A flat, circumferential air bearing surface on the ceramic block surrounds the opening adjacent the disk for generating coupling forces that deform the disk out of its nominal plane and into intimate contact with a transducing gap on the head. The air bearing surface possesses an RMS surface roughness of at least 10 Angstroms because of its ceramic composition. The advancing disk interacts with the roughed air bearing surface of the stabilizer to generate a microscopic turbulence therebetween which functions as a "lubricant" to lower drag, and thereby to lower current draw on the motor rotating the disk. A preferred ceramic material is barium titanate.

2 Claims, 5 Drawing Sheets

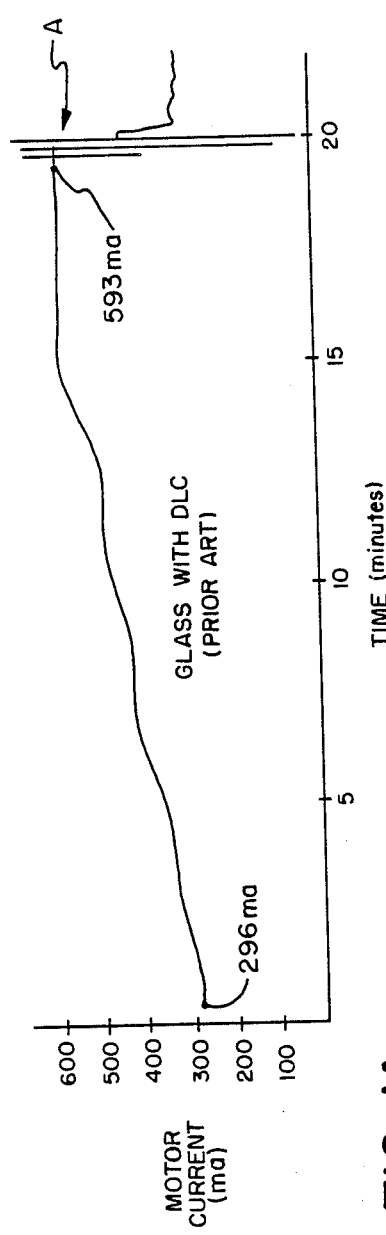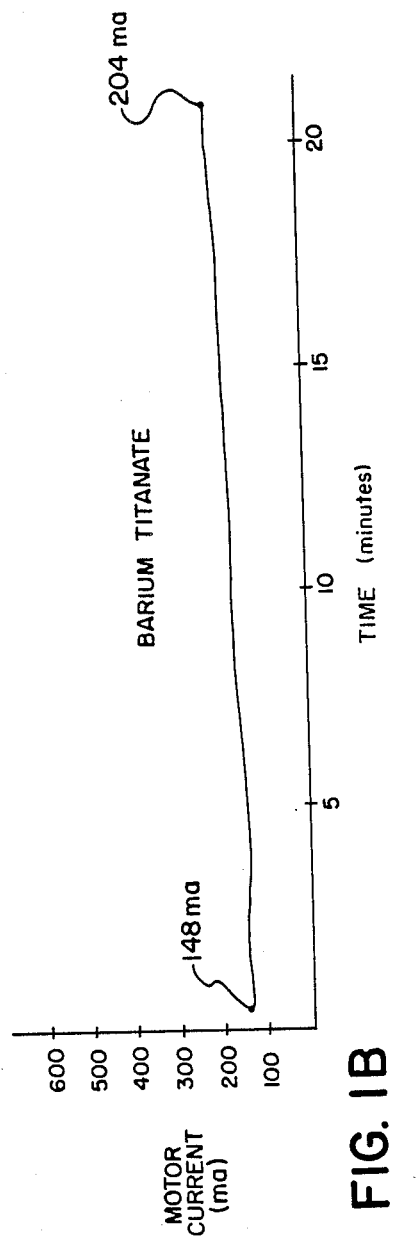

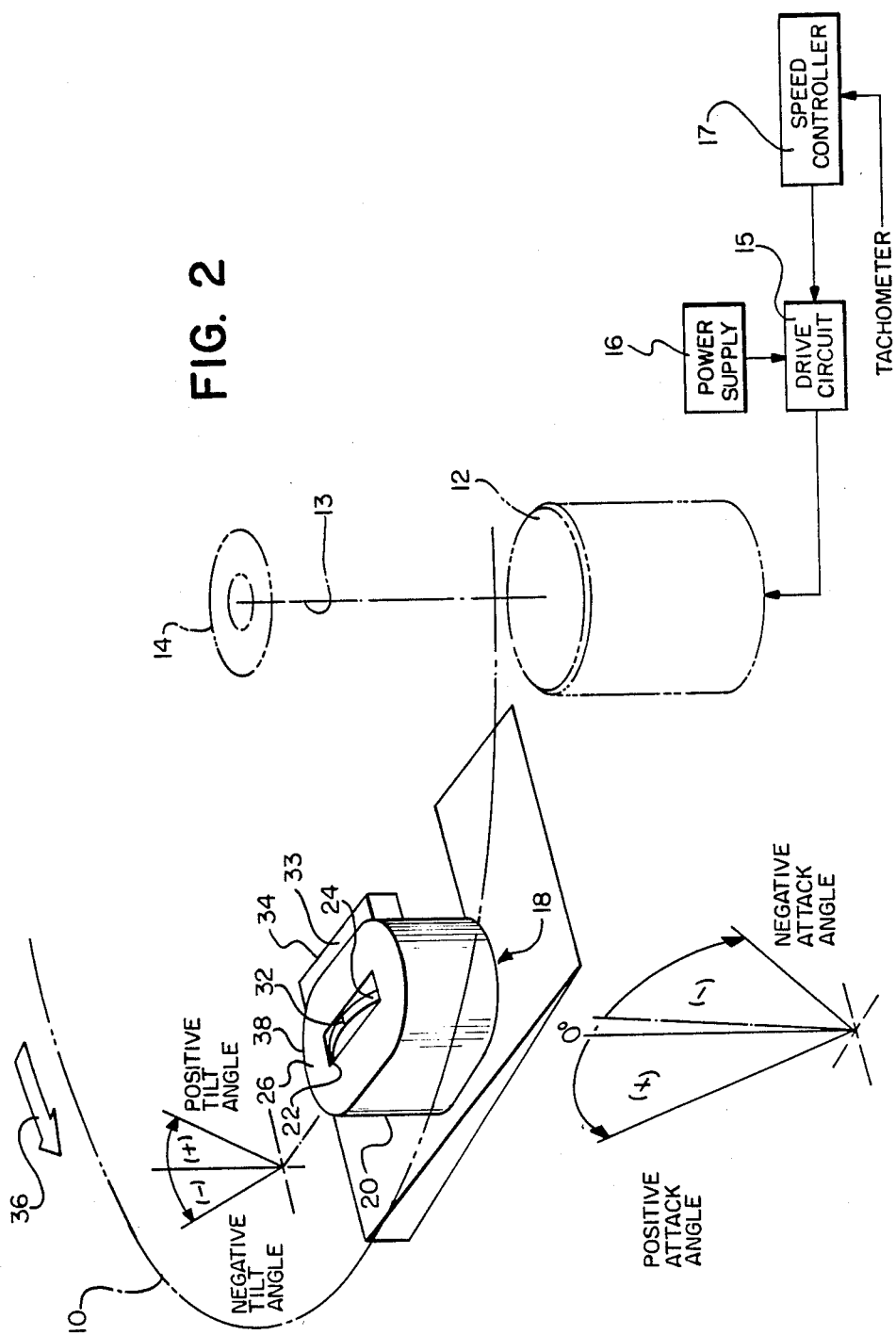

LOW DRAG STABILIZER DEVICE FOR STABILIZING THE INTERFACE BETWEEN A TRANSDUCER AND A MOVING MEDIUM

BACKGROUND OF THE INVENTION

1. Field of the Invention

The invention generally relates to recording and/or reproducing apparatus for use with a flexible storage medium, such as a non-rigid disk. More particularly, the invention relates to a stabilizer device supported in relation to a magnetic head for maintaining an effective interface between the head and a magnetic storage medium.

2. Brief Description of the Drawings

The prior art and the invention will be described in relation to the drawings, in which:

FIGS. 1A and 1B are charts showing current draw on the drive motor for a coated glass stabilizer (prior art) and a ceramic stabilizer formed of barium titanate in accordance with the invention;

FIG. 2 is a perspective view of a stabilizer exhibiting low drag according to the invention and arranged at a negative attack angle in relation to a moving medium;

DESCRIPTION RELATIVE TO THE PRIOR ART

Figure 3:
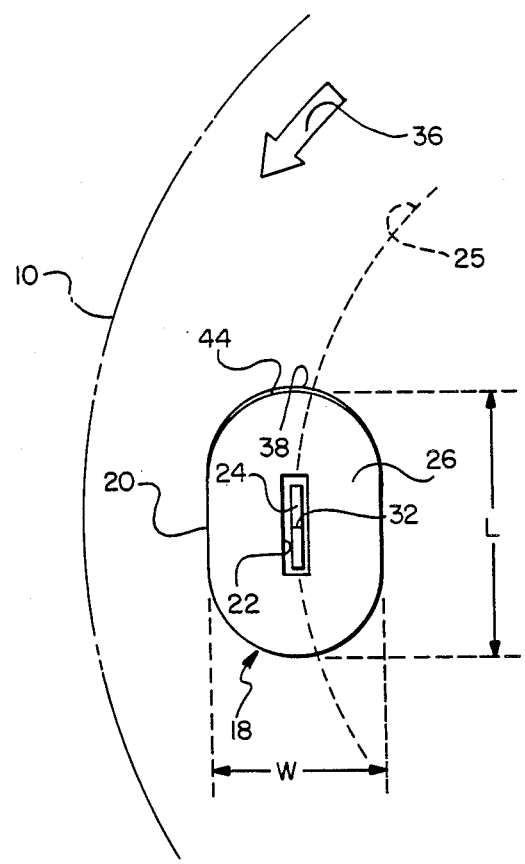
FIG. 3 is a plan view of the stabilizer of FIG. 2, as seen through the medium.

Magnetic recording and playback relative to a pliant, "floppy" magnetic disk requires that a stable, constant interface be maintained between the moving disk and a magnetic record/playback head. U.S. Pat. No. 4,578,727 discloses that such a stable interface may be established by surrounding the transducing surface of the magnetic head with a small, flat air bearing surface (and thus only having to interact with one side of the disk). The head is supported in relation to an opening in the air bearing surface to a negative pressure cavity. When the disk is rotated at relatively high speeds, a negative pressure is formed in the cavity that pulls a nearby section of the rotated disk into contact with the transducing surface of the head thereby ensuring a constant interface for effective magnetic coupling. In companion U.S. Pat. No. 4,620,250, the air bearing surface is disposed at an angle with respect to the disk medium so that a leading edge of the air bearing surface penetrates slightly into the nominal plane of the rotating disk, thus "scraping" air away from the surface and "choking" off the flow of air over the air bearing surface. This is believed to assist in the formation of strong coupling forces along the air bearing surface.

Nonetheless, it is difficult to continuously stabilize the magnetic interface if there is any irregularity inherent in the medium forming the disk, especially an irregularity due to a "warp" or like deformation in the medium. In U.S. patent application Ser. No. 19,468 (filed Feb. 26, 1987 and assigned to the assignee of the present invention) the stabilizer described in the above patents is improved by establishing an abrupt transition in the leading edge of the air bearing surface that penetrates the nominal plane of the moving disk. The transition, which is a lineal edge facing the oncoming medium, appears to act as a fulcrum. A force is apparently generated that turns a section of the moving disk about the lineal transition and flattens the disk down upon the head. This force contributes to the coupling forces seen in the prior devices. The improved stabilizer is effective in consistently "capturing", that is, establishing an interface with, the surface of all but the most significantly warped disks.

Despite the described improvements, it was found that after spinning the disk adjacent the stabilizer for awhile, the stabilizer began to exert more and more drag on the disk. In particular, the disk drive motor began to draw more and more current as more and more torque was required to overcome the frictional drag imposed by the interface. The problem was especially severe because of its unpredictability; the use of a particular stabilizer could draw, e.g., 125–150 ma. with one disk and then, e.g., 400–450 ma. in motor current with another. Such wide variations in motor current imposes severe demands on a motor speed controller; indeed, speed is all but uncontrollable when current is so variable. Moreover, the higher current generates excessive heat in the drive circuit and can force the system into thermal shutdown.

In testing stabilizer materials, it seemed desirable to make the air bearing surface as smooth as possible. Glass, for example, was polished and lapped smooth with the expectation that the media would slide more easily over a smooth glass stabilizer. Then a diamond-like carbon material was coated on the glass air bearing surface and its leading edge to enhance hardness and smoothness. Current draw, as shown for the motor drive circuit by FIG. 1A, nonetheless remained a significant problem. While the level of motor current might be acceptable at first (e.g., 296 ma at the beginning of a representative test run as illustrated by FIG. 1A), continued operation required more and more current until the current requirement became excessive (e.g., about 590 ma after only 15 minutes). Indeed, the current draw as shown by FIG. 1A forced the circuit into uncontrolled saturation after 20 minutes, as indicated by the erratic current fluctuations in the region A.

SUMMARY OF THE INVENTION

The solution appeared elusive until barium titanate was used as a stabilizer material. Barium titanate, which is a ceramic material, was initially selected for its density and hardness. This ceramic material was found to be useful in the interface for longer periods than any other tested material without significantly increasing drag, and, as a result, without significantly increasing current draw upon the motor. (In FIG. 1B, which is scaled comparably to FIG. 1A, the motor current experienced with a barium titanate stabilizer does not exceed 204 ma over a similar period). Though a solution was in hand, the reasons remained elusive. The properties that allow such low drag operation are best understood at this time to be related not at all to smoothness, as earlier expected, but to some combination of porosity and surface roughness. (Hardness and density of the material may still play a beneficial role). Though not well understood at this time, the conductivity of the stabilizer may also be helpful in reducing drag by reducing the accumulation of static electrical charge and the resultant static "cling" between the stabilizer and the media. In addition, the lubricant incorporated in the media may play some part.

Surface roughness, however, is believed as of now to play the most significant role. Porosity in turn is closely related to surface roughness as it defines an uneven, irregular surface with hills and valleys. Though the media and the stabilizer are in substantial contact, porosity and roughness are believed to create a turbulent airflow in or near the narrow channel between the media and the stabilizer. Increased turbulence apparently reduces drag by acting to "lubricate" the interface, allowing the media to slide by the stabilizer with less torque upon the motor. It is further believed, though not experimentally verified at this time, that other materials (especially other ceramic materials of the titanate family, e.g., calcium titanate) with the requisite surface characteristics will perform as well as the tested barium titanate material.

DETAILED DESCRIPTION OF THE PREFERRED EMBODIMENT

The invention will be described in relation to a stabilizer device supporting a transducer and to their mutual cooperation with a moving storage medium in order to establish an effective interface for mutual coupling of a signal. A drive unit for moving the medium is conventional and will not be described in detail. The preferred embodiment will be described in relation to a magnetic transducer and a magnetic storage medium such as a magnetic disk. While the description is directed generally to a magnetic disk, it should be understood that the disk can be one that is permanently emplaced in the drive unit, or one that is removable from the drive unit, and furthermore that a removable disk can be a self-contained unit or contained within a conventional cartridge jacket having openings for access to the disk.

Figure 4:
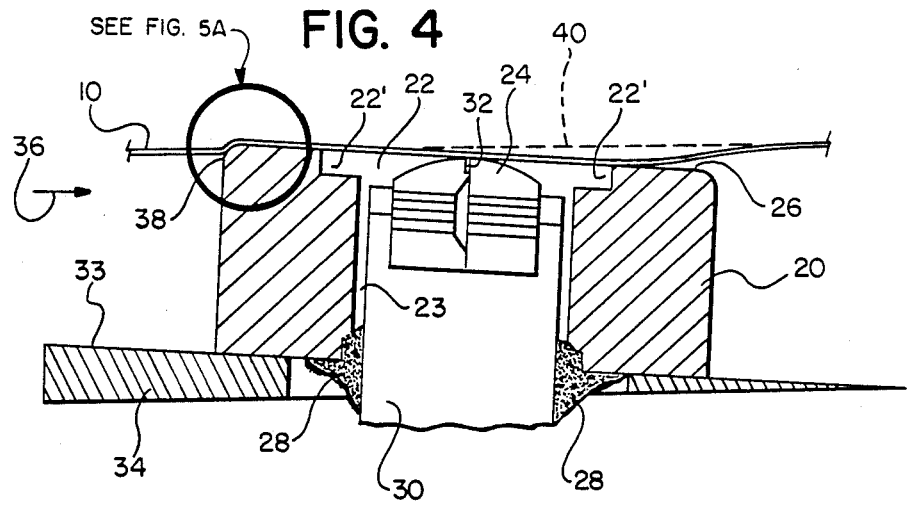
FIG. 4 is a cross-sectional view of the stabilizer of FIG. 2, showing in particular its penetration into the nominal plane of the moving medium.

Details of the stabilizer device are shown by FIGS. 2, 3 and 4. A magnetic disk 10 (shown in broken line in FIGS. 2 and 3 so as to reveal underlying structure) is mounted for rotation by a drive motor 12. The motor 12 has a spindle 13 connecting to a hub 14 that is securely attached to an inside periphery of the disk 10. Current for the motor 12 is supplied by a drive circuit 15, which is connected to a power supply 16. For example, the motor 12 may be a brushless dc motor and the drive circuit 15 would provide electronic commutation of the motor. Feedback from a tachometer or like reference signal generator is provided to a speed controller circuit 17 for controlling the speed of the motor 12.

A stabilizer device 18 includes a stabilizing block 20 having an opening 22 for exposing a magnetic head 24 to the surface of the disk 10. A circumferential, flat air bearing surface 26 surrounds the opening 22 on the side of the block 20 that faces the disk 10. The block 20 is, according to the invention, made of a hard material having a moderate degree of surface roughness. The property of surface roughness of the preferred material (barium titanate ($BaTiO_3$)), and of the material of the prior art (glass with a diamond-like carbon (DLC) coating), was characterized by conventional root-mean-square measurement of surface height with a phase-shift interference microscope. The following root-mean-square figures (i.e., standard deviations) were obtained in Angstroms (Å) from measurements of the air bearing surface 26 for a stabilizer made of each material:

| $BaTiO_3$ | glass w/DLC |
|---|---|
| 13Å | 7Å |

It is believed from these measurements that a surface roughness of greater than about 10Å is characteristic of a material that will regularly perform in accordance with the invention. (Since several other properties, e.g., conductivity, may interact with surface roughness to reduce current draw upon the motor, it is not possible to positively conclude that every material having a surface roughness of less than 10Å will not have some beneficial effect on motor torque.) The surface height measurements can be made with, for example, a phase-shift interference microscope of the type manufactured by Wyco Corporation, Tucson, Arizona or a Nomarski microscope profilometer manufactured by Photographic Sciences Corporation, Rochester, N.Y. It can also be appreciated that porosity at a microscopic level in a hard material, such as a ceramic material, tends to ensure a certain level of surface roughness even after lapping and finishing of the air bearing surface 26. With porous material, such lapping only exposes further, different areas of porosity. Even if the media is worn smooth, the stabilizer remains porous and the turbulence in the interface will remain. The preferred material is a conductive barium titanate available from Kyocera Corporation (Kyoto, Japan) as material item number T793H. The particular barium titanate material used was manufactured in a hot isostatic pressing (HIP) process. Though the circumferential surface 26 is shown to be oval in shape, other shapes are also believed to work in the practice of the invention. As best shown by FIG. 3, the stabilizer device is used in a system in which the head 24 traces a circular track 25 during recording and repeatedly traces the same track 25 during reproduction. Each track can correspond, for example, to a single video picture (e.g., a video field) in a still video recording/reproduction system.

As best shown by FIG. 4, the opening 22 leads to a cavity 23 in the block 20. A non-magnetic potting compound 28, such as epoxy, supports a shoe 30 within the cavity 23 in relation to the stabilizing block 20. The head 24 is mounted on the shoe 30 to locate a magnetic gap 32 in relation to the opening 22 so that the gap 32 slightly protrudes above the plane of the air bearing surface 26. (FIG. 4 also shows a modification in which a step 22' is recessed about 0.005 inches below the air bearing surface 26 toward the edge of the opening 22. This step is believed to assist in the generation of coupling forces between the media 10 and the head 24, as well as acting to at least somewhat reduce motor drive current requirements.) The stabilizing block 20 is supported with respect to the disk 10 along a flat inclined surface 33 of a wedge-shaped support 34 (or any other kind of like support) mounted upon a conventional head positioning carriage (not shown). As shown by FIG. 2, the support 34 and the head 24 therewith are disposed at a particular angle (the attack angle) with respect to magnetic track movement and at a further particular angle (the tilt angle) with respect to a radial of the disk 10. While the precise dimensions of the stabilizer are not critical and may vary depending upon the size of the disk, head structure, etc., the particular dimensions used in connection with a single (or dual, as will be described in connection with FIG. 6) track head for recording fifty circular tracks on a disk 47 mm in diameter include (referring to FIG. 3) an approximate length L of 0.350 inches (0.328 inches for dual track application) and width W of 0.250 inches.

When the magnetic disk 10 is rapidly rotated by the drive motor 12 in a direction shown by an arrow 36, successive portions of the disk 10 are in substantial contact with a leading curved edge 38 of the flat air bearing surface 26. (The term "substantial contact", as here used, allows for a narrow channel between the media and stabilizer device which is believed to permit the passage of a thin film of air.) The angle of the wedge-shaped support 34, which defines the attack angle, limits penetration of the leading curved edge 38 into a nominal plane 40 of the disk 10. (The nominal plane is the plane established by the rotating disk absent any interference.) The extent of penetration is generally quite small, e.g., 0.006 in. Preferably the attack angle should be as small as possible to prevent excessive wear of the transducer and/or media surfaces. In the preferred embodiment, the air bearing surface 26 is disposed at a negative angle of attack of 2.0° and at a tilt angle of 0°.

Figure 5A:
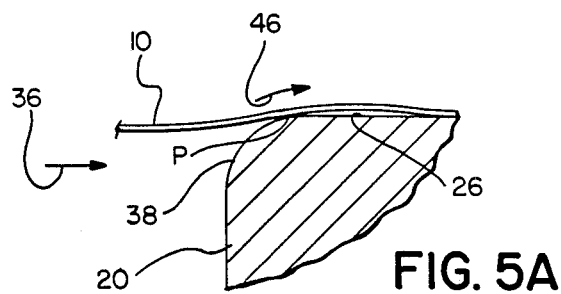
FIGS. 5A and 5B are detailed views of a leading edge portion of the stabilizer of FIG. 4, one showing the interface between the medium and the stabilizer and the other showing the angular configuration of the leading edge.
Figure 5B:
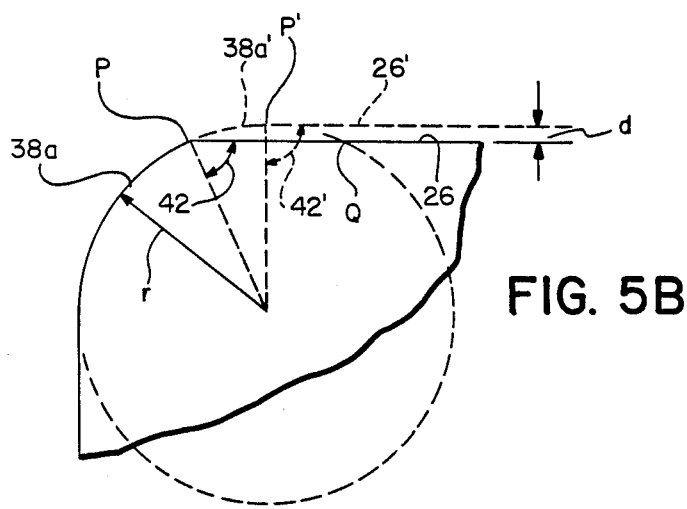

As shown by FIG. 5B, a portion 38a of the leading edge 38 is defined by a radius r (r=0.012 in. according to the preferred embodiment) up to a certain point P, where the smoothly varying surface 38a abruptly meets the flat air bearing surface 26 in a non-tangential transition. The edge-tracing radius r meets the air bearing surface 26 at an included angle 42 that is acute. As further shown by broken line in FIG. 5B, if the radius r is allowed to further trace a surface to point P', the joinder with the flat surface 26' (parallel to surface 26) would be in tangential relation, that is, the line defined by the surface 26' would be tangent to the circle described by radius r. When the leading edge 38 is subjected to an abrupt transition at the point P, it can be seen that the air bearing surface 26 coincides with a chord PQ of the circle defined by the radius r. In the preferred embodiment, the perpendicular distance d of this chord PQ from the broken line surface 26' is between 0.0005 and 0.0015 inches.

A stabilizer with the non-tangential transition P may be manufactured in any number of conventional ways. One way that works especially well is to manufacture a stabilizer of the type with a continuation of the blended radius leading edge 38a', as shown in FIG. 5B, leading into the surface 26'. Then the surface 26' is lapped by conventional techniques until the lapped surface coincides with the air bearing surface 26 shown in FIG. 5B. This requires removal of a thickness corresponding to the distance d, that is, between 0.0005 and 0.0015 inch.

As better shown by FIG. 3, the transition point P is one of many points defining a curved line 44 that first meets the surface of the disk 10 as it is rotated over the penetrating leading edge 38 of the stabilizer 18. This curved line 44, again shown as a point P in FIG. 5A, serves as a fulcrum about which the contacting section of the disk 10 attempts to rotate. Though the precise mechanism is not well established, it is believed that a torque force is generated according to an arrow 46 (FIG. 5A) that attempts to twist the disk 10 clockwise. This force serves to deflect the disk 10 from its nominal plane 40 firmly upon the air bearing surface 26 despite any irregularities such as warps. In addition, it is believed that the leading edge 38 operates as an "air scraper" to choke off the flow of moving air over the air bearing surface 26, thereby forming a Bernoulli pull down force across the surface, which also helps to deflect the disk 10 from its nominal plane 40. Furthermore, as successive portions of the disk 10 move over the opening 22 and its underlying cavity 23, air will be removed from the cavity, causing the formation of a negative low pressure in the cavity. This negative pressure generates a pull down force on successive portions of the rotated disk 10 as each portion is moved across the opening, which further deflects the disk 10 into contact with the transducer gap 32 of the head 24.

The net interaction of all of these forces generates a sufficient coupling force for the stabilization of the magnetic interface even for media possessing significant warps or other deformations. Despite stabilization of the interface, however, the aforementioned drag is experienced with conventionally-prepared stabilizers. As shown by FIG. 1A, current draw on the motor steadily increases over operational time when a stabilizer made of glass coated with diamond-like carbon (DLC) is used in establishing the head-media interface. FIG. 1B, on the other hand, shows the relatively constant current draw over the same time for a stabilizer formed of barium titanate ($BaTiO_3$). It is hypothesized that the surface porosity and roughness of the air bearing surface 26 formed of barium titanate generates a microscopic turbulence in a narrow channel between the surface 26 and the moving medium 10. The turbulence is enough to effect a "lubrication" of the two surfaces without disturbing the coupling forces that act upon the media. It is also noted that surface conductivity may play a part, which is not completely understood at this time, in reducing frictional drag. For instance, the higher surface resistance of glass with DLC coating (approximately $10^{12}$ ohms-cm) may encourage the build-up of static charge as compared to the relatively more conductive barium titanate ($1.2 \times 10^5$ ohms-cm).

Figure 6:
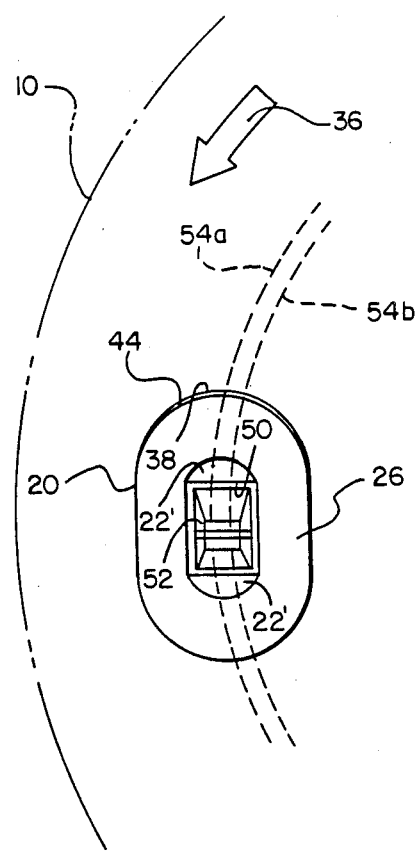
FIG. 6 is a plan view similar to FIG. 3 but of a stabilizer that supports a dual-track thin film head.

The invention has been described in detail with particular reference to a preferred embodiment thereof, but it will be understood that further variations and modifications can be effected within the spirit and scope of the invention. For example, as shown by FIG. 6, the preferred stabilizer may have an opening 50 large enough (without substantially changing the external dimensions L and W) to accommodate a dual gap head 52 for tracing two tracks 54a and 54b. FIG. 6 also shows a plan view of the 0.005 inch recess 22' mentioned in connection with FIG. 4. Furthermore different types of head structure may be accommodated. For example, FIG. 6 shows an opening to a negative pressure cavity sufficient to contain the dual transducing gaps of a thin-film head 52 rather than a wound ferrite head. In the case of a dual-gap stabilizer, it has been found that somewhat better pull-down performance is obtained by having the epoxy 28 completely seal one end of the cavity 23 (see FIG. 4). Conversely, such a complete seal is unnecessary for a single-gap stabilizer; indeed, vents are provided through the epoxy 28 if it should happen to seal the cavity 23.

Furthermore, while the stabilizer device has been disclosed as being homogeneous in regard to its composition (e.g., $BaTiO_3$), it is not inconceivable that a hard coating could be applied to the air bearing surface especially if such a coating takes on the surface aspect of the underlying material.

What is claimed is:

1. A stabilizer device for stabilizing the movement of a flexible magnetic disk mounted for rotation by a drive motor that advances the disk in a predetermined rotary direction in relation to a transducer, said device comprising:
- a ceramic stabilizing block comprised of conductive barium titanate and having a cavity in which the transducer is supported in spaced relationship to an edge of said cavity;
- a circumferential flat air bearing surface integrally formed on said ceramic block around said cavity on the side of said stabilizing block facing the disk, said ceramic surface having a RMS surface roughness of at least 10 Angstroms;
- a curved edge on at least the side of said circumferential roughened surface that faces the advancing disk; and
- means for disposing said stabilizing block at an angle with respect to the nominal plane of the disk so that said curved edge penetrates the nominal plane of the advancing disk, causing the disk to twist over said curved edge and to deflect upon said air bearing surface, whereby the surface of the advancing disk interacts with said roughened, conductive air bearing surface to minimize drag between the surfaces due to mechanical and electrical sources, thereby reducing the current required by said drive motor.

2. A stabilizer device as claimed in claim 1 in which the resistivity of said ceramic stabilizing block is less than about $10^6$ ohms-cm.

* * * * *